(12) United States Patent
Ilchenko et al.

(10) Patent No.: US 6,853,479 B1
(45) Date of Patent: Feb. 8, 2005

(54) APPARATUS AND METHOD FOR COUPLING LIGHT BETWEEN AN OPTICAL RESONATOR AND A SEMICONDUCTOR CHIP WITH A MINIMUM NUMBER OF COMPONENTS AND ALIGNMENT STEPS

(75) Inventors: Vladimir S. Ilchenko, La Canada, CA (US); Dmitri Kossakovski, South Pasadena, CA (US); Kouros Sariri, Encino, CA (US)

(73) Assignee: OEwaves, Inc., Pasadena, CA (US)

( * ) Notice: Subject to any disclaimer, the term of this patent is extended or adjusted under 35 U.S.C. 154(b) by 175 days.

(21) Appl. No.: 10/231,860

(22) Filed: Aug. 30, 2002

Related U.S. Application Data
(60) Provisional application No. 60/316,833, filed on Aug. 30, 2001.

(51) Int. Cl.[7] ............................................. H01S 3/00
(52) U.S. Cl. ................................................ 359/337.5
(58) Field of Search ........................... 372/32; 359/344

(56) References Cited

U.S. PATENT DOCUMENTS

| | | | | |
|---|---|---|---|---|
| 5,064,619 | A | | 11/1991 | Finlan .................... 422/82.05 |
| 5,231,533 | A | | 7/1993 | Gonokami et al. ......... 359/328 |
| 5,351,127 | A | | 9/1994 | King et al. ................. 356/445 |
| 5,414,554 | A | * | 5/1995 | Aoyama .................... 359/344 |
| 5,532,493 | A | | 7/1996 | Hale et al. ................ 250/458.1 |
| 5,652,556 | A | | 7/1997 | Flory et al. ............. 333/219.1 |
| 5,790,583 | A | | 8/1998 | Ho ............................. 372/92 |
| 5,825,799 | A | | 10/1998 | Ho et al. ...................... 372/92 |
| 5,926,496 | A | | 7/1999 | Ho et al. ...................... 372/92 |
| 6,009,115 | A | * | 12/1999 | Ho ............................. 372/92 |
| 6,016,197 | A | | 1/2000 | Krivoshlykov ............. 356/345 |
| 6,103,535 | A | | 8/2000 | Pilevar et al. ............. 436/518 |
| 6,251,688 | B1 | | 6/2001 | Erb et al. .................. 436/518 |
| 6,278,523 | B1 | | 8/2001 | Gorecki ..................... 356/450 |
| 6,349,106 | B1 | * | 2/2002 | Coldren ....................... 372/50 |
| 6,417,957 | B1 | * | 7/2002 | Yao ............................. 359/334 |
| 6,476,959 | B2 | * | 11/2002 | Yao ............................. 359/334 |
| 6,567,436 | B1 | * | 5/2003 | Yao et al. ..................... 372/32 |
| 6,580,532 | B1 | * | 6/2003 | Yao et al. ..................... 398/39 |
| 6,594,061 | B2 | * | 7/2003 | Huang et al. ............... 359/239 |
| 6,624,000 | B1 | * | 9/2003 | Coldren ....................... 438/29 |

(List continued on next page.)

FOREIGN PATENT DOCUMENTS

| | | | | |
|---|---|---|---|---|
| EP | 0 533 390 A1 | 3/1993 | ........... | H01S/3/083 |
| WO | WO 01/40757 A2 | 6/2001 | | |
| WO | WO 01/96913 A1 | 12/2001 | ............ | G02B/5/18 |
| WO | WO 02/13337 A1 | 2/2002 | ............ | H01S/3/08 |

OTHER PUBLICATIONS

Greedy et al. Spectral Index Method Applied to the Analysis of Whispering Gallery Modes in Semiconductor Disk Resonators. MMET 2000 Proceedings, pp. 412–414, 2000.*

(List continued on next page.)

*Primary Examiner*—Thomas H. Tarcza
*Assistant Examiner*—Deandra M. Hughes
(74) *Attorney, Agent, or Firm*—Fish & Richardson P.C.

(57) ABSTRACT

A system includes an electro-absorptive modulator having opposing surfaces, a first semiconductor optical amplifier having opposing surfaces, a photodetector having opposing surfaces, a second semiconductor optical amplifier having opposing surfaces, a microwave link, and an optical resonator. One of the opposing surfaces of the first semiconductor optical amplifier is coupled to one of the opposing surfaces of the electro-absorptive modulator. One of the opposing surfaces of the second semiconductor optical amplifier is coupled to one of the opposing surfaces of the photodetector. The microwave link is coupled between the photodetector and the electro-absorptive modulator. The optical resonator is for coupling evanescent components of light propagated between the first semiconductor optical amplifier and the second semiconductor optical amplifier.

46 Claims, 8 Drawing Sheets

U.S. PATENT DOCUMENTS

| | | | | | |
|---|---|---|---|---|---|
| 2001/0024317 | A1 | * | 9/2001 | Yao | 359/334 |
| 2002/0018611 | A1 | * | 2/2002 | Maleki et al. | 385/15 |
| 2003/0067676 | A1 | * | 4/2003 | Wang et al. | 359/344 |
| 2003/0142895 | A1 | * | 7/2003 | Bond et al. | 385/2 |
| 2003/0202548 | A1 | * | 10/2003 | Andersen et al. | 372/20 |

OTHER PUBLICATIONS

Krauss et al. CW Operation of Semiconductor Ring Lasers. Electronics Letters, Dec. 6, 1990. Vol. 26, No. 25, pp. 2095 2097.*

Baba, Toshihinko. Photonic Band and Whispering Gallery Mode Emitters. LEOS '97, 1997. Pp. 3–4, vol. 2.*

V.B. Braginsky, M.L. Gorodetsky, and V.S. Ilchenko "Quality–Factor and Nonlinear Properties of Optical Whispering-Gallery Modes," Physics Letters A, vol. 137, No. 7, 8, pp. 393–397 (1989).

L. Collot, V. Lefevre–Seguin, M. Brune, J.M. Rainard and S. Haroche "Very High–Q Whispering–Gallery Mode Resonances Observed on Fused Silica Microspheres," Europhysics Letters 23 (5), pp. 327–334 (1993).

V.V. Vassiliev, V.L. Velichansky, V.S. Ilchencko, M.L. Gorodetsky, L. Hollberg, and A.V. Yarovitsky "Narrow–Line–Width Diode Laser with a High–Q Microsphere Resonator," Optics Communications 158, 305–312 (1998).

A.T. Rosenberger and J.P. Rezac "Evanescent–Wave Sensor Using Microsphere Whispering–Gallery Modes," In *Laser Resonators III*, Proceedings of SPIE vol. 3930, pp. 186–192 (2000).

Steve Blair and Yan Chen "Resonant–Enhanced Evanescent-Wave Fluorescence Biosensing with Cylindrical Optical Cavities," *Applied Optics*, vol. 40, No. 4, pp. 570–582, Feb. 1, 2001.

www.technologyreview.com/magazine/sep01/7_oewaves.asp "OEwaves—Light–wave timekeeper for Faster Networks," by Claire Tristram (Sep. 2001).

* cited by examiner

APPARATUS AND METHOD FOR COUPLING LIGHT BETWEEN AN OPTICAL RESONATOR AND A SEMICONDUCTOR CHIP WITH A MINIMUM NUMBER OF COMPONENTS AND ALIGNMENT STEPS

CROSS-REFERENCE TO RELATED APPLICATION

The present application claims priority under 35 U.S.C. § 119(e) to U.S. Provisional Application No. 60/316,833, filed on Aug. 30, 2001, which is expressly incorporated by reference in its entirety as though fully set forth herein.

ORIGIN OF THE INVENTION

The systems and techniques described herein were made in the performance of work under an ATP (Advanced Technology Program) contract issued by the National Institute of Standards & Technology, and are subject to the provisions of Public Law 96-517 (35 U.S.C. § 202) in which the Contractor has elected to retain title. The U.S. Government has a paid-up license in this invention and the right in limited circumstances to require the patent owner to license others on reasonable terms as provided for by the terms of contract number 70NANB1H3054 awarded by the National Institute of Standards & Technology.

FIELD OF THE INVENTION

The present invention relates to electro-optical systems, and in particular, to an electro-optical system for coupling light between an optical resonator and at least one semiconductor chip.

BACKGROUND OF THE INVENTION

Optical resonators are electro-optical devices that are included in optical feedback loops to store energy having only specific resonant mode frequencies. Optical resonators are often small in size, having diameters on the order of millimeters, and may be used in many electro-optical system applications, including optical sensors for biological and chemical compounds, electro-optical oscillators and modulators, and tunable optical filters. The optical resonators are curved optical waveguides, for example, a cylinder, a sphere, or a toroid within which light is internally reflected at the inner surface of the optical resonator.

Optical resonators can support resonator modes of light called whispering-gallery modes ("WGMs"), and thus, are often referred to as whispering-gallery mode resonators. WGMs occur when light having an evanescent wave component travels via internal reflection around the periphery of the optical resonator. The evanescent waves extend beyond the optical resonator's outer surface and may be coupled into an adjacent optical coupler as long as the optical coupler is located within the extent of the evanescent wave, typically on the order of the light's wavelength.

Many optical resonators which propagate WGMs of light have extremely low transmission losses, and as a result, have a very high quality factor ("Q"). High-Q optical resonators are desirable because the higher the Q, the longer the amount of time the internally reflected light remains within the optical resonator and the greater the reduction of the spectral line width and phase noise. The ultimate intrinsic Q of the optical resonator ($Q_0$) is limited by the optical losses of the resonator material. Optical resonators having radiuses of 10 to a few hundred micrometers have been produced with Q's in excess of $1 \times 10^9$ (see V. B. Braginsky, M. L. Gorodetsky, V. S. Ilchenko, Phys. Lett. A37, 393 (1989); L. Collot, V. Lefevre-Seguin, M. Brune, J. M. Raimond, S. Haroche, Europhys. Lett. 23, 327 (1993)). In particular, a Q in excess of $1 \times 10^{10}$ was demonstrated for optical resonators, and a Q of $10^{11}$ is expected for glass microsphere optical resonators with a resonant wavelength of light at 1550 nanometers, where the intrinsic loss of glass is a minimum.

Coupling to WGMs of the optical resonator can be accomplished through an evanescent wave from an adjacent optical coupler. Coupling losses between the optical coupler and the optical resonator are exponentially dependent upon the distance d between the surface of the optical coupler and the optical resonator ~ exp (−d/r*), where r* is the effective scale length of evanescent field of the resonator for the excited WGM as expressed in the following equation:

$$r^* = \lambda \sqrt{(4n(n_{res}/n_{out})^2 - 1)}$$

where:
$\lambda$ is the wavelength of light evanescently coupled between the optical coupler and the optical resonator;
$n_{res}$ is the index of refraction of the optical resonator; and
$n_{out}$ is the index of refraction outside the surface of the optical resonator.

Because the optical resonator and optical coupler are small in size they may be integrated within small housings or devices that can be incorporated into various optical or electro-optical systems including opto-electronic oscillators ("OEOs") which may be used to generate microwave frequency signals. In addition to having an optical resonator, OEOs include an electrically-controlled optical modulator included in a feedback loop having a gain greater than one. The opto-electronic feedback loops includes a photodetector for conversion of optical signals into electrical signals that are used to control the modulator and sustain the optical signal.

In general, many modes of oscillation may oscillate simultaneously in an OEO. The optical resonator and the electro-optic feedback loop each generate their own resonant modes. Mode matching between the modes of the optical resonator and the modes of the electro-optic feedback loop is required. A mode that does not satisfy the mode matching conditions is subject to loss. Because of the mode matching requirements, the mode spacing of the electro-optic feedback loop is limited to the narrow mode spacing of the high-Q optical resonator.

One challenge associated with mass producing integrated electro-optical systems that include optical resonators and electro-optic feedback loops is providing for ease and repeatability in accurately setting and maintaining the exact position of the components that make up the electro-optical system.

Another challenge associated with mass producing these integrated electro-optical systems is related to the waveguide that is used for evanescent coupling of light between the optical resonator and the electro-optic feedback loop. The basis for optical coupling using a waveguide is in-phase matching of the field of the waveguide to the field in the optical resonator's WGM which is accomplished by cutting the waveguide 10, for example an optical fiber 12, at the angle Φ as shown in FIG. 1. In order to satisfy the phase matching requirement $\Phi = \arcsin(n_{res}/n_{wg})$, where $n_{res}$ is the effective index of refraction for azimuthal propagation of the WGMs as closed waves circulating in a microsphere optical resonator 14, and $n_{wg}$ is the effective index of refraction for the light guided by the waveguide. The precision cut of the waveguide to create the required angle is difficult to implement. This is especially true in the case of semiconductor waveguides where efficient growth and the cleave angle relate to the orientation of the waveguide material. In addition, the above mentioned angle phase matching scheme is not suitable for cases in which the indices of refraction of the waveguide and the optical resonator are significantly different, for example, when the waveguide is a silicon optical fiber having a core index of refraction of 1.46 and the optical resonator is made of lithium niobate having an index of refraction of 2.06.

Therefore, there is a need for electro-optical systems having a reduced number of components that must be aligned during the fabrication process. Furthermore, there is a need for electro-optical systems in which the components are configured such that the precise angle cut of the waveguide is not required.

SUMMARY OF THE INVENTION

An exemplary system and embodies the invention includes an electro-absorptive modulator having opposing surfaces, a first semiconductor optical amplifier having opposing surfaces, a photodetector having opposing surfaces, a second semiconductor optical amplifier having opposing surfaces, a microwave link, and an optical resonator. One of the opposing surfaces of the first semiconductor optical amplifier is coupled to one of the opposing surfaces of the electro-absorptive modulator. One of the opposing surfaces of the second semiconductor optical amplifier is coupled to one of the opposing surfaces of the photodetector. The microwave link is coupled between the photodetector and the electro-absorptive modulator. The optical resonator is for coupling evanescent components of light propagated between the first semiconductor optical amplifier and the second semiconductor optical amplifier.

Another system includes a first semiconductor optical amplifier having opposing surfaces, a second semiconductor optical amplifier having opposing surfaces, an optical resonator, and a first waveguide. The optical resonator is for coupling evanescent components of light propagated between the first semiconductor optical amplifier and the second semiconductor optical amplifier. The first waveguide is coupled between one surface of the second semiconductor optical amplifier and the optical resonator.

Other aspects of the present invention will become readily apparent to those skilled in the art from the following detailed description, which shows and describes exemplary embodiments of the invention, simply by way of illustration of the best mode contemplated for carrying out the invention. The invention is capable of other and different embodiments, and its several details are capable of modifications in various respects, all without departing from the invention. Accordingly, the drawings and description are to be regarded as illustrative in nature, and not as restrictive.

BRIEF DESCRIPTION OF THE DRAWINGS

Various features, aspects, and advantages of the invention will be better understood with regard to the following description, appended claims, and accompanying drawings where:

DETAILED DESCRIPTION OF THE PREFERRED EMBODIMENTS

Figure 2:
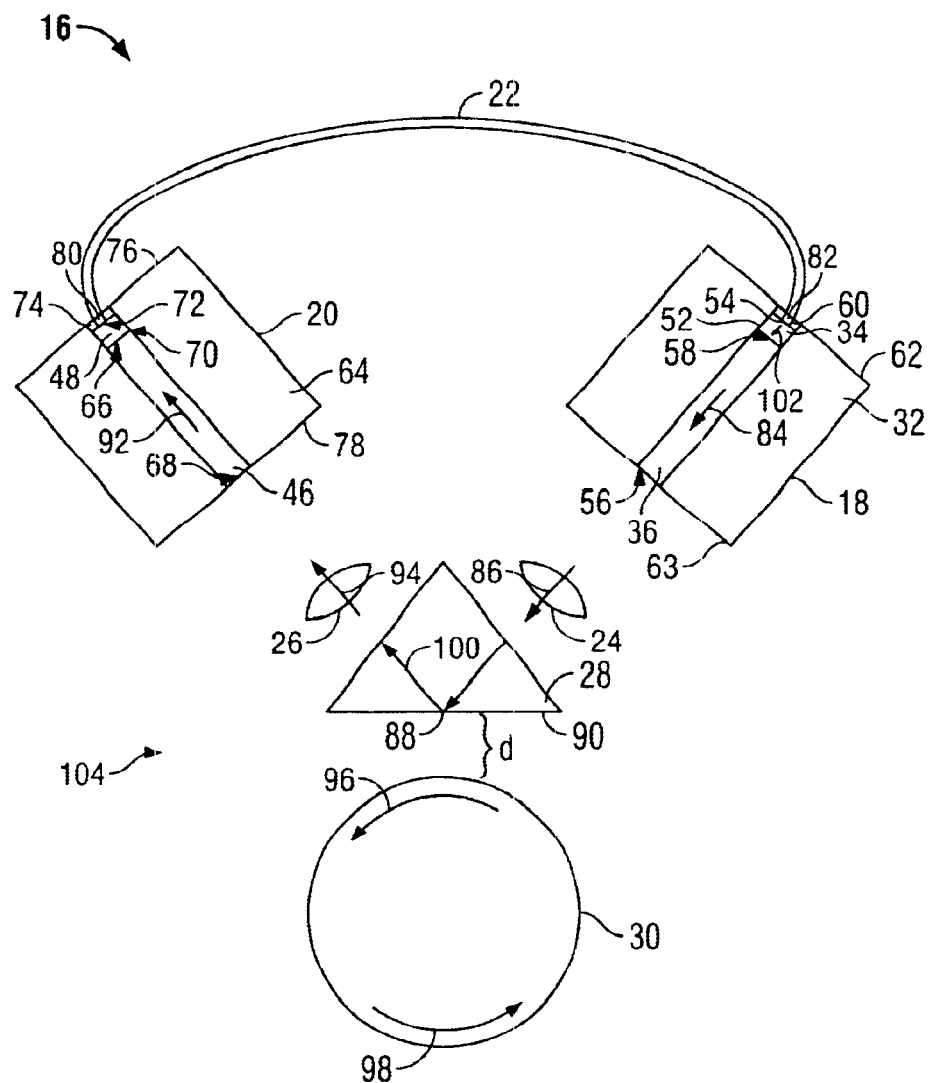
FIG. 2 is a diagram of an electro-optical system that includes first and second chips, a microwave link, first and second lenses, a single-reflection prism, and an optical resonator.

The present invention involves electro-optical systems that include OEOs in combination with optical resonators. FIG. 2 is a diagram, not to scale, of one exemplary embodiment of the present invention that includes an electro-optical system having an a first chip 18, a second chip 20, a microwave link 22, a first lens 24, a second lens 26, a prism coupler 28, and an optical resonator 30. The first chip includes a first substrate 32 on which an electro-absorptive modulator ("EAM") 34 and a first semiconductor optical amplifier ("SOA") 36 are configured.

The EAM 34 is an electro-optic device that is used to change the absorption of an optical signal, and thus modulate the optical signal, as a function of an electrical potential applied to the EAM as discussed in U.S. patent application Ser. No. 09/491,988 to Yao, Maleki, and Ilchenko which is entitled "Opto-Electronic Oscillators Having Optical Resonators" and is incorporated by reference in its entirety as though fully set forth herein. Therefore, the EAM is used in an electro-optical system used to control the gain of the electro-optical system.

Figure 1:
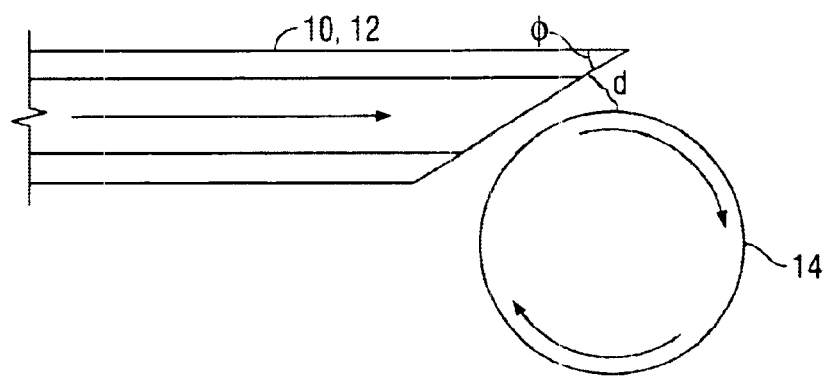
FIG. 1 is a cross-sectional view of an optical fiber coupler and spherical optical resonator.
Figure 3:
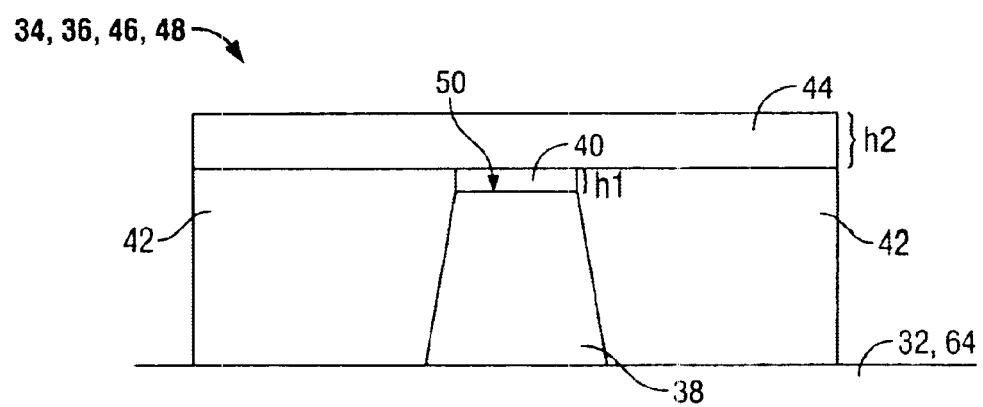
FIG. 3 is a cross-sectional view of an electro-optical component.

FIG. 3 is a cross-sectional view, not to scale, of an exemplary configuration of the EAM 34. FIG. 3 shows the first substrate 32 which functions as a ground electrode and may be formed of indium phosphide. Waveguide material 38, for example, may be a bulk or quantum well structure formed on indium gallium arsenide phosphide with appropriate buffer layers and conductive layers. An ohmic contact pad 40 is formed from metal, for example, titanium/platinum/gold, deposited on top of the waveguide material to a height "h1" of approximately 4000 angstroms. An insulator 42, for example polyimide or semi-insulating indium phosphide, is formed on either side of the waveguide material. An electrode 44 is formed on top of the pad and the insulator. The electrode is made of metal, for example, gold, and deposited to a height "h2" of approximately one micrometer. The heights "h1" and "h2" are kept to a minimum to minimize the capacitance of the pad and electrode. The first substrate, waveguide material, pad, insulator, and electrode are formed using methods, for example photolithographic processes, known by those skilled in the art of semiconductor fabrication.

In operation, an electrical potential applied to the electrode 44 creates an electrical field between the electrode and the first substrate 32. The electrical field passes through the waveguide material 38 and alters the refractive index of the waveguide material.

The first SOA 36, as well as the second SOA 46 discussed later, is an electro-optic device that is doped so that it functions as a laser and thus generates light when an electrical potential and associated driving current are applied to the electrode 44 of the SOA. The first SOA, as well as the second SOA and the photodetector 48 discussed later, is configured similar to the EAM 32 configuration shown in FIG. 3. The first SOA, and the second SOA discussed later, has the added feature of quantum wells (not shown) formed in a periodic manner along the top surface 50 of the waveguide material 38.

Referring to FIG. 2, both the EAM 34 and the first SOA 36 have opposing surfaces 52 and 54, 56 and 58, respectively. One surface 52 of the EAM is coupled to one 58 of the opposing surfaces of the first SOA. The opposing surface 54 of the EAM is coupled to a highly-reflective mirror 60 located at an input edge 62 of the first chip 18. Typically, the highly-reflective mirror is made of a single or multi-layer dielectric material, for example, SiO or $SiO_2/TiO_2$. The opposing surface 56 of the first SOA is formed at an output edge 63 of the first chip.

The highly-reflective mirror 60 and the components that make up the EAM 34 and first SOA 36 are formed on the first substrate 32 by methods, for example, photolithographic processes, known by those skilled in the art of semiconductor fabrication.

The second chip 20 includes a second substrate 64, which may be formed of the same materials as the first chip 18, on which a second SOA 46 and a photodetector 48 are configured. The configuration and function of the second SOA is identical to that of the previously discussed first SOA 36. The photodetector is configured similar to that of the EAM 34, however, the photodetector is biased by an external voltage (not shown), different from external bias voltage (not shown) of the EAM, such that when an optical signal passes through the waveguide material 38 of the photodetector an electrical potential is generated by the photodetector.

As shown in FIG. 2, both the second SOA 46 and the photodetector 48 have opposing surfaces 66 and 68, 70 and 72, respectively. One 70 of the opposing surfaces of the photodetector is coupled to one 66 of the surfaces of the second SOA. The opposing surface 72 of the photodetector is coupled to a partially-reflective mirror 74 located an output edge 76 of the second chip. Typically, the partially-reflective mirror is made of a single or multi-layer dielectric material, for example, SiO or $SiO_2/TiO_2$. The opposing surface 68 of the second SOA is formed at an output edge 78 of the second chip.

The highly-reflective mirror 60, partially-reflective mirror 74, and the components that make up the EAM 34, photodetector 48, and first and second SOAs 36 and 46, respectively, are formed on the first and second substrates 32 and 64, respectively, by processing methods, for example, photolithographic processing methods, known by those skilled in the art of semiconductor fabrication.

The microwave link 22 is an impedance matching circuit used to couple microwave signals generated by the photodetector 48 into the EAM 34 with minimal reflectance at the electro-optical system's operational resonant frequency. The microwave link is needed to provide for impedance matching between the photodetector and EAM since the impedance of the photodetector is approximately 1 KΩ while the impedance of the EAM is approximately 10 Ω to 100 Ω. Since the microwave link matches the impedances of the photodetector and the EAM, a maximum amount of energy may be transferred from the photodetector to the EAM without the need for an amplifier. The microwave link (circuit) consists of standard components, passive and, if needed active, and is custom designed to accommodate for specific characteristics of the devices used and operational frequencies.

The microwave link has opposing ends 80 and 82. One 86 of the opposing ends of the microwave link is coupled to the photodetector 48 through the partially-reflective mirror 74. The other opposing end 82 of the microwave link is coupled to the EAM 34 through the highly-reflective mirror 60.

In preferred embodiments the first and second lenses 24 and 26, respectively, are gradient index lenses. The first and second lens 24 and 26, respectively, are lens model 024-0690 made by Optosigma located in Santa Ana, Calif. The prism coupler 28 is prism model PS910 made by Thorlabs located in Newton, N.J. The optical resonator 30 is made of fused silica having an index of refraction of approximately 1.46.

The first chip 18 is positioned such that the optical axis of the first SOA 36, indicated by the straight arrow 84, is aligned with a midpoint 86 of the first lens 24 and a point 88 at an edge 90 of the prism coupler 28 at which light is evanescently coupled into the optical resonator 30. Similarly, the optical axis of the second SOA 46, indicated by the straight arrow 92, is aligned with both a midpoint 94 of the second lens 26 and the point 88 at the edge 90 of the prism coupler at which light is evanescently coupled into the optical resonator. The optical resonator is positioned adjacent to the point 88 at the edge 90 of the prism coupler where light is evanescently coupled into the optical resonator. The optical resonator is spaced away from the prism coupler by a distance "d" that typically is approximately 0.1 to 3 times the wavelength of the light.

In some embodiments, the output edge 63 of the first chip 18 is positioned approximately two focal lengths of the first lens 24 away from the midpoint 86 of the first lens, and the midpoint of the first lens is positioned approximately two focal lengths of the first lens away from the point 88 of at the edge 90 of the prism coupler 28 that is closest to the optical resonator 30 where light is evanescently coupled into the optical resonator. Similarly, the midpoint 94 of the second lens 26 is positioned two focal lengths of the second lens away from the point 88 at the edge 90 of the prism coupler where light is evanescently coupled into the optical resonator. Also, the input edge 78 of the second chip 20 is positioned approximately two focal lengths of the second lens away from the midpoint of the second lens.

In operation, the first SOA 36 is stimulated by an external voltage applied to its electrode 44 and produces light that propagates along the optical axis of the first SOA, indicated by the straight arrow 84, both toward the highly-reflective mirror 60 and away from the highly-reflective mirror and toward the output edge 63 of the first chip 18. The light exits the first chip and then passes through the first lens 24 and is focused by the first lens on the point 88 at the edge 90 of the prism coupler 28 where the light is evanescently coupled into the optical resonator 30.

The light is internally reflected at the edge 90 of the prism coupler 28. An evanescent component of light is coupled into the optical resonator 30 where the light travels around the outside edge of the optical resonator, as indicated by the curved arrows 96 and 98, due to internal reflection. The component of the light that is internally reflected, as indicated by the straight arrow 100, and a component of light that is evanescently coupled from the optical resonator back into the prism coupler propagate together out of the prism coupler, through the second lens 26 which focuses the light on the light edge 78 of the second chip 20, and into the second SOA 46.

The light then propagates along the optical axis of the second SOA 46, as indicated by the straight arrow 92, and is amplified by additional light produced by the second SOA which, similar to the first SOA 36, has an electrical potential applied to its electrode 44. Next, the light propagates from the second SOA and into the photodetector 48 which generates an electrical potential. The light propagates through the photodetector and encounters the partially-reflective mirror 74 resulting in a partial reflectance of the light back toward the second SOA. The reflected light propagates backs through the second SOA, second lens 26, prism coupler 28, first lens 24, first SOA, and EAM 34 until the reflected light encounters the highly-reflective mirror 60 which causes the reflected light to propagate through the EAM and first SOA toward the output edge 63 of the first chip 18. Thus, an optical cavity is formed between the highly-reflective mirror and the partially-reflective mirror that supports wavelengths of light such that an integer number of half-wavelengths equals the full length of the optical cavity. The function of the first and second SOAs is to provide the optical gain needed to sustain optical oscillation in the optical cavity.

The electrical potential generated by the photodetector 48 propagates through the microwave link 22 into the EAM 34. The EAM modulates light propagating through the EAM along it's optical axis, indicated by the straight arrow 102, as a function of the electrical potential received from the photodetector before the light propagates back into the first SOA.

Thus, the highly-reflective mirror 60, EAM 34, first and second SOAs 36 and 46, respectively, first and second lens 24 and 26, respectively, prism coupler 28, photodetector 48, partially-reflective mirror 74, and microwave link 22 form a low-Q, closed-loop, electro-optic system 104. The optical resonator 30 has a high-Q and is used to stabilize and narrow the frequency value of the selected modes, those satisfying the mode matching requirements, that are generated by the low-Q, closed-loop, electro-optic system. Therefore, the optical resonator provides for high-Q stabilization of the broad modes generated by the other components and broad-band suppression of noise. The high-Q optical resonator also provides for higher output power.

The embodiment depicted in FIG. 2 is advantageous in that it provides for the EAM 34 and first SOA 36 to be co-located on the first chip 18 which is separable from the second chip 20 on which the photodetector 48 and second SOA 46 are co-located. Thus, the embodiment depicted in FIG. 2 reduces the total number of individual movable components that need to be aligned during manufacturing. Also, the first chip and the second chip can be moved relative to one another and relative to the first and second lenses 24 and 26, respectively, prism coupler 28, and optical resonator 30. Furthermore, this embodiment does not include waveguides that are fabricated with an angled tip, and thus, eliminates the problems associated with fabricated such angled-tip waveguides.

Figure 4:
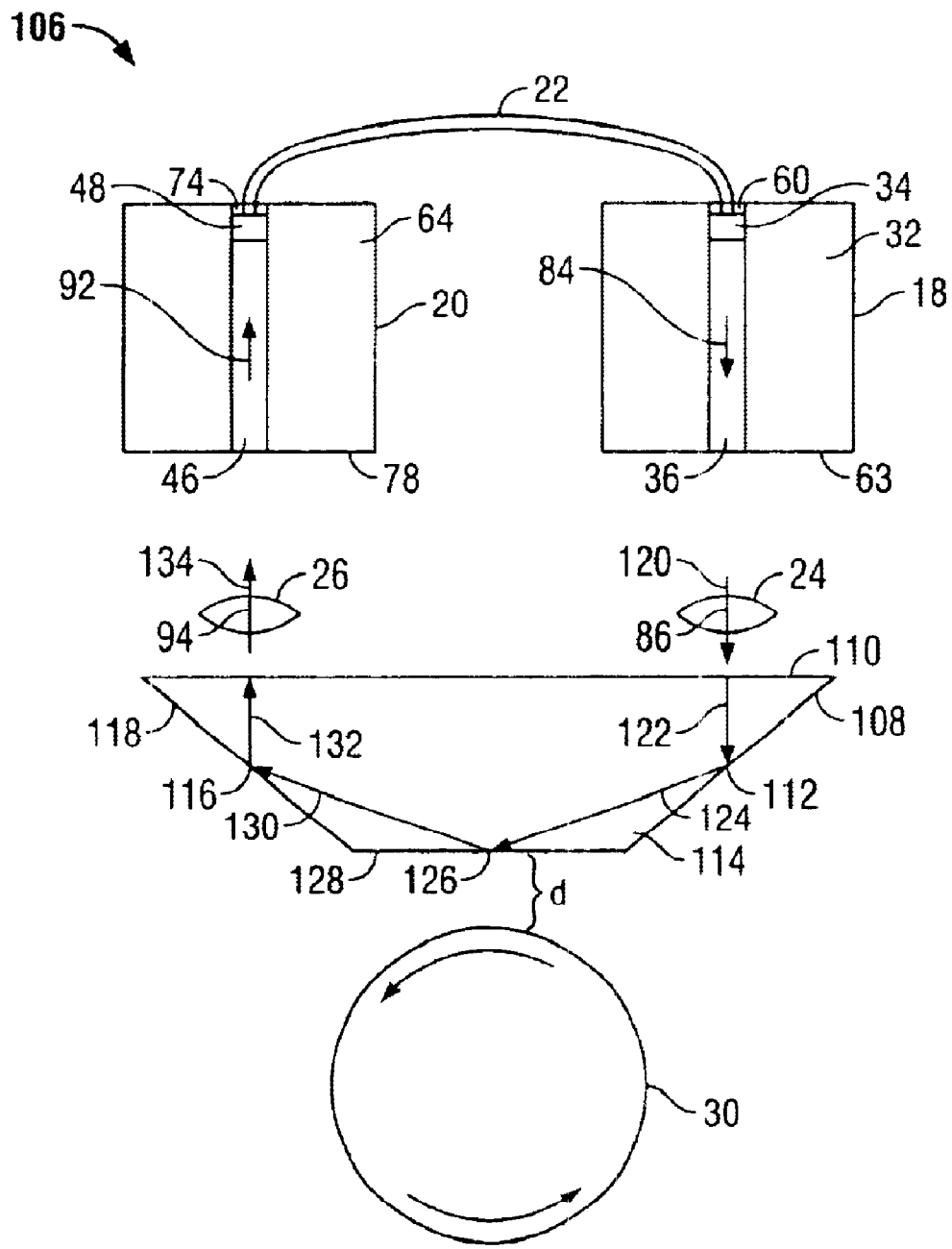
FIG. 4 is a diagram of an electro-optical system that includes first and second chips, a microwave link, first and second lenses, a double-reflection prism, and an optical resonator.

FIG. 4 is a diagram, not to scale, of another exemplary embodiment of the present invention that is similar to the embodiment illustrated in FIG. 2 in that it depicts an electro-optical system 106 having a highly-reflective mirror 60, EAM 34, first and second SOAs 36 and 46, respectively, photodetector, partially-reflective mirror 76, microwave link 22, first and second lenses 24 and 26, respectively, prism coupler 108, and optical resonator 30. However, in the embodiment of FIG. 4, the prism coupler 108 is a double-reflection prism coupler instead of a single-reflection prism coupler as shown in FIG. 2. The prism coupler shown in FIG. 4 is prism model PS990 made by Thorlabs located in Newton, N.J.

As shown in FIG. 4, both the first and second chips 18 and 20, respectively, are positioned so that their respective optical axes, indicated by straight lines 84 and 92, of both the first and second SOAs 36 and 46, respectively, are parallel to one another and perpendicular to a top edge 110 of the prism coupler 108. The midpoint 86 of the first lens 24 is positioned between the output edge 63 of the first chip and the prism coupler. Also, the midpoint 94 of the second lens 26 is positioned between the input edge 78 of the second chip and the prism coupler.

In preferred embodiments, the midpoints 86 and 94 of the first and second lenses 24 and 26, respectively, are located approximately two focal lengths away from the output edge 63 and input edge 78 of the first and second chips 18 and 20, respectively. Also, the midpoint 86 of the first lens 24 is positioned approximately two focal lengths of the first lens away from a first point 112 at which the light that enters the prism coupler internally reflects against an edge 114 of the prism coupler 108. Similarly, the midpoint 94 of the second lens 26 is positioned approximately two focal lengths of the second lens away from the last point 116 at which the light that propagates through the prism coupler internally reflects against another edge 118 of the prism coupler before propagating out of the prism coupler and toward the second lens.

The mode of operation of the embodiment depicted in FIG. 4 is similar to that of the embodiment of FIG. 2, however the light that passes through the first lens 24 propagates through the top edge 110 of the prism coupler 108, into the prism coupler, and internally reflects at the first point 112, as indicated by straight arrows 120, 122, and 124. Next, the light internally reflects at a point 126 on a bottom edge 128 of the prism where an evanescent component of the light is coupled into the optical resonator 30. The internally reflected component of the light and light evanescently coupled from the optical resonator into the prism coupler propagate together through the prism coupler, internally reflect at an edge 118 of the prism coupler and travel through the second lens 26, as indicated by straight arrows 130, 132, and 134.

The embodiment depicted in FIG. 4 has the added advantage that the first chip 18 and the second chip 20 can be positioned in closer proximity than the first and second chips in the embodiment of FIG. 2, thus resulting in the microwave link 22 having a shorter length.

Figure 5:
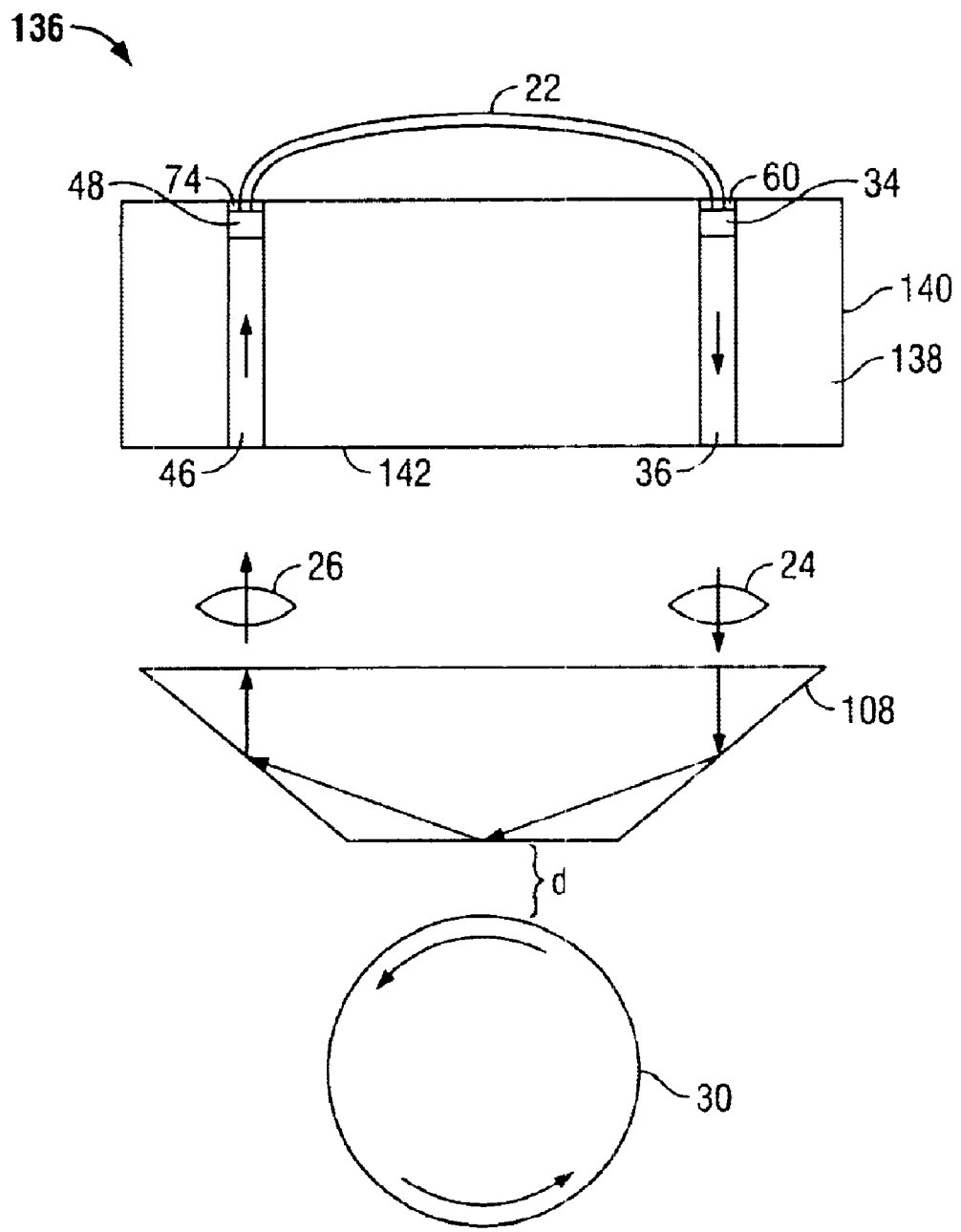
FIG. 5 is a diagram of an electro-optical system that includes a single chip, a microwave link, first and second lenses, a double-reflection prism, and an optical resonator.

FIG. 5 is a diagram, not to scale, of another exemplary embodiment of the present invention that is similar to the embodiment of FIG. 4. However, in the embodiment of FIG. 5, the highly-reflective mirror 60, EAM 34, first and second SOAs 36 and 46, respectively, photodetector 48, and partially-reflective mirror 74 of the electro-optical system 136 are configured on a single substrate 138, and thus are co-located in a single chip 140. Also, the output edge 63 of the first chip 18 and the input edge 78 of the second chip 20 in FIG. 4 are both located along the light interface edge 142 of the single chip in FIG. 5. The single substrate may be fabricated from the same material as that used in the first and second substrates 32 and 64, respectively, in the embodiments of FIGS. 2, 3, and 4. The mode of operation of the embodiment of FIG. 5 is the same as that of the embodiment depicted in FIG. 4. This embodiment has the added advantage of reducing the total number of individual components that need to be aligned during fabrication of the electro-optical system 136 shown in FIG. 5.

Figure 6:
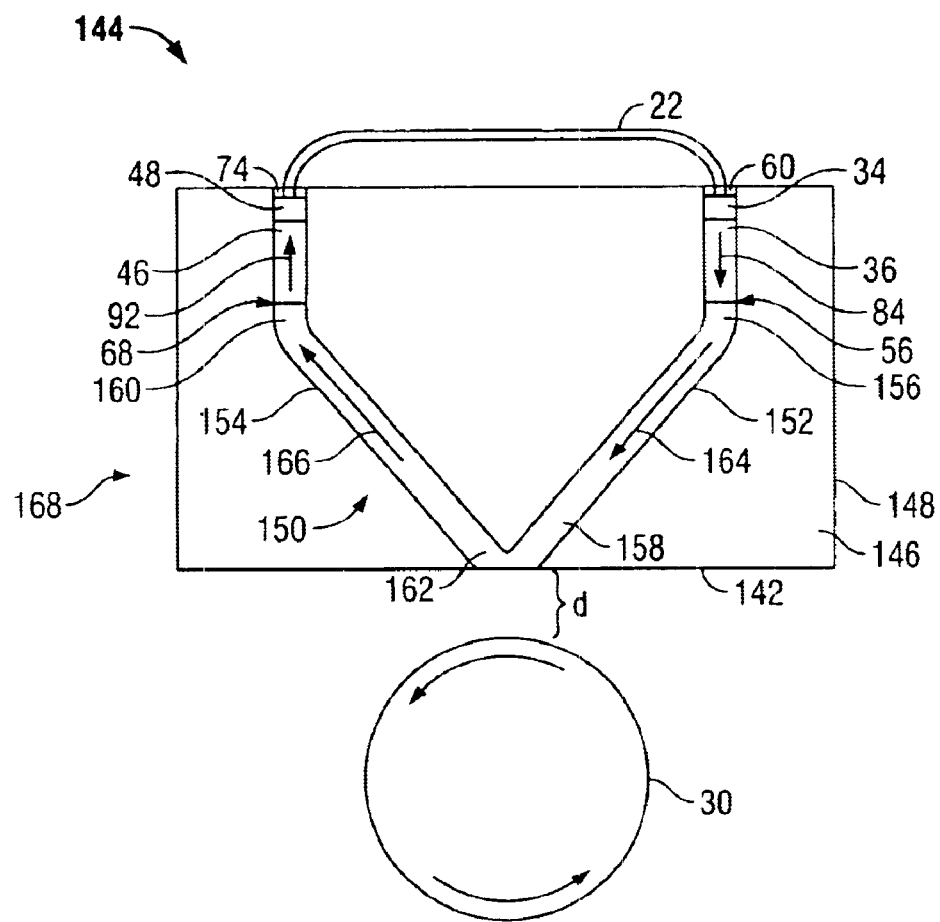
FIG. 6 is a diagram of an electro-optical system that includes a single chip, a microwave link, and an optical resonator.

FIG. 6 is a diagram, not to scale, of another exemplary embodiment of the present invention that is similar to the embodiment of FIG. 5 in that the electro-optical system 144 includes a highly-reflective mirror 60, EAM 34, first and second SOAs 36 and 46, respectively, photodetector 48, and partially-reflective mirror 74 that are configured on a single substrate 146, and thus are co-located in a single chip 148. However, the embodiment of FIG. 6 differs from the embodiment of FIG. 5 in that the embodiment of FIG. 6 also includes a passive V-shaped waveguide 150, made up of a first branch 152 and a second branch 154, that optically couples the first SOA 36 to the second SOA 46. The V-shaped waveguide may be made of a ternary or quaternary material such as indium gallium arsenide phosphide with a bandgap varying from approximately 0.8 to 1.4 eV, and is formed in a similar manner to that of the waveguide material in the EAM 34 as shown in FIG. 3. Because the V-shaped waveguide is formed of indium gallium arsenide phosphide, the refractive index of the V-shaped waveguide is greater than the refractive index of the underlying indium phosphide single substrate or adjacent insulator 42, thus, providing for internal reflection at the edges of the waveguide.

Referring to FIG. 6, both the first and second branches 152 and 154, respectively, of the V-shaped waveguide 150 have opposing ends 156 and 158, 160 and 162, respectively. One end 156 of the V-shaped waveguide's first branch 152 is coupled to one surface 56 of the first SOA 36. Also one end 160 of the V-shaped waveguide's second branch 154 is coupled to a surface 68 of the second SOA 46. The opposing ends 158 and 162 of both the first and second branches 152 and 154, respectively, are co-located at the light interface edge 142 of the signal chip 148 where the V-shaped waveguide's first branch meets the V-shaped waveguide's second branch at an angle. Also, the embodiment of FIG. 6 differs from the embodiment of FIG. 5 in that it does not include the first and second lenses 24 and 26, respectively, or the prism coupler 108. Instead, the optical resonator 30 is positioned adjacent to the light interface edge of the single chip at a distance "d" away from light interface edge where the V-shaped waveguide's first and second branches meet.

In operation, the embodiment of FIG. 6 differs from the embodiment of FIG. 5 in that light that is generate by the first SOA 36 propagates into the V-shaped waveguide's first branch 152 and travels along the first branch in the direction of the first branch's curved optical axis, indicated by curved arrow 164, to the light interface edge 142 of the single chip 148. Where the V-shaped waveguide's first branch meets the V-shaped waveguide's second branch at an angle. At the light interface edge, the light is internally reflected, at which point an evanescent component of the light is coupled into the optical resonator 30. The internally reflected component of the light along with light evanescently coupled from the optical resonator into the V-shaped waveguide 150 propagates together along the second branch's curved optical axis, indicated by curved arrow 166, into the second SOA 46.

The highly-reflective mirror 60, EAM 34, first and second SOAs 36 and 46, respectively, V-shaped waveguide 150, photodetector 48, partially-reflective mirror 74, and microwave link 22 together form a low-Q closed loop electro-optic system 168 in which the first and second SOAs lase when an electrical potential is applied to the first and second SOA's electrodes 44. The high-Q optical resonator 30 is used to marrow the matching oscillation modes that are generated by the low-Q, closed-loop, electro-optic system.

The embodiment depicted in FIG. 6 is advantageous because, in addition to having the highly-reflective mirror 60, EAM 34, first and second SOAs 36 and 46, respectively, V-shaped waveguide 150, photodetector 48, and partially-reflective mirror 74 on a single chip 148, the embodiment eliminates the need for first and second lenses 24 and 26, respectively, and the prism coupler 28 and 108 that were included in the embodiment of FIGS. 2, 4, and 5.

Figure 7:
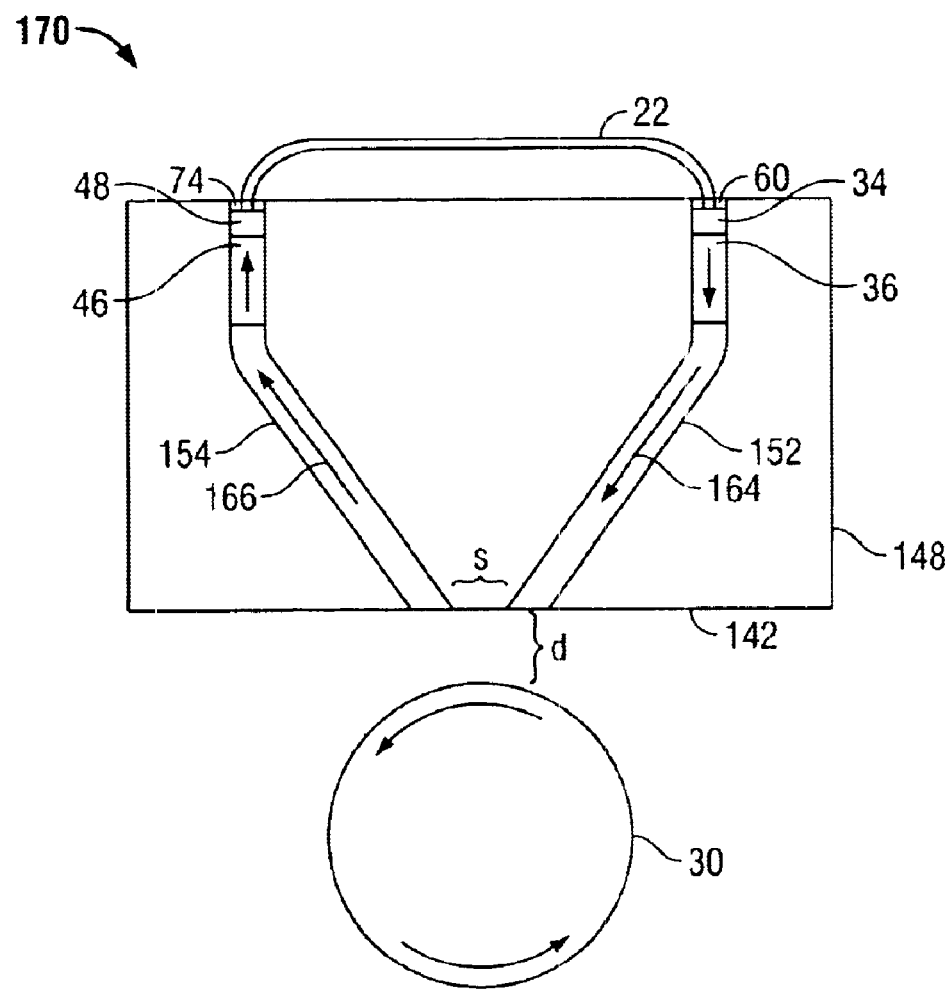
FIG. 7 is a diagram of an other electro-optical system that includes a single chip, a microwave link, and an optical resonator.

FIG. 7 is a diagram, not to scale, of another embodiment of the present invention that is similar to the embodiment of FIG. 6, however, instead of the first and second branches 152 and 154 of the V-shaped waveguide 150 connecting together, the two branches in this electro-optical system 170 are separated from one another at the light interface edge 142 of the single chip 148 by a distance "s" which is typically from 2 to 15 micrometers. The embodiment of FIG. 7 may be formed by cleaving the light interface edge of the single chip in FIG. 6 such that the V-shaped waveguide's first and second branches are not optically coupled together in the absence of an external optical element.

In operation, the embodiment of FIG. 7 differs from that of the embodiment depicted in FIG. 6 in that a component of light does not propagate along the optical axis of the first branch indicated by curved arrow 164, internally reflect at the light interface edge 142 of the single chip 148, and then propagate along the optical axis of the second branch indicated by the curved arrow 166. Rather, because the first and second branches 152 and 154, respectively, are not optically coupled together in the embodiment of FIG. 7, light propagates from the first SOA 36, along the curved optical axis of the first branch, is internally reflected at the light interface edge, and evanescently couples into the optical resonator 30. Instead of light being coupled into the V-shaped waveguide's second branch from both the internal reflection of the light at the single chip's light interface edge and evanescent coupling light from the optical resonator, light is only evanescently coupled out of the optical resonator and into the V-shaped waveguide's second branch. Likewise, light reflected from the partially-reflective mirror 74 propagates through the second SOA 46, the V-shaped waveguide's second branch, internally reflects at the light interface edge, is evanescently coupled into the optical resonator, is evanescently coupled out of the optical resonator and into the V-shaped waveguide's first branch, propagates through the V-shaped waveguide's first branch and the first SOA until it encounters the highly-reflective mirror 60. Therefore, the optical resonator in the embodiment of FIG. 7 is an external optical element that is an integral part of the system's optical path and is not just used for narrowing the frequency mode as in the embodiments of FIGS. 2, 4, 5, and 6.

Figure 8:
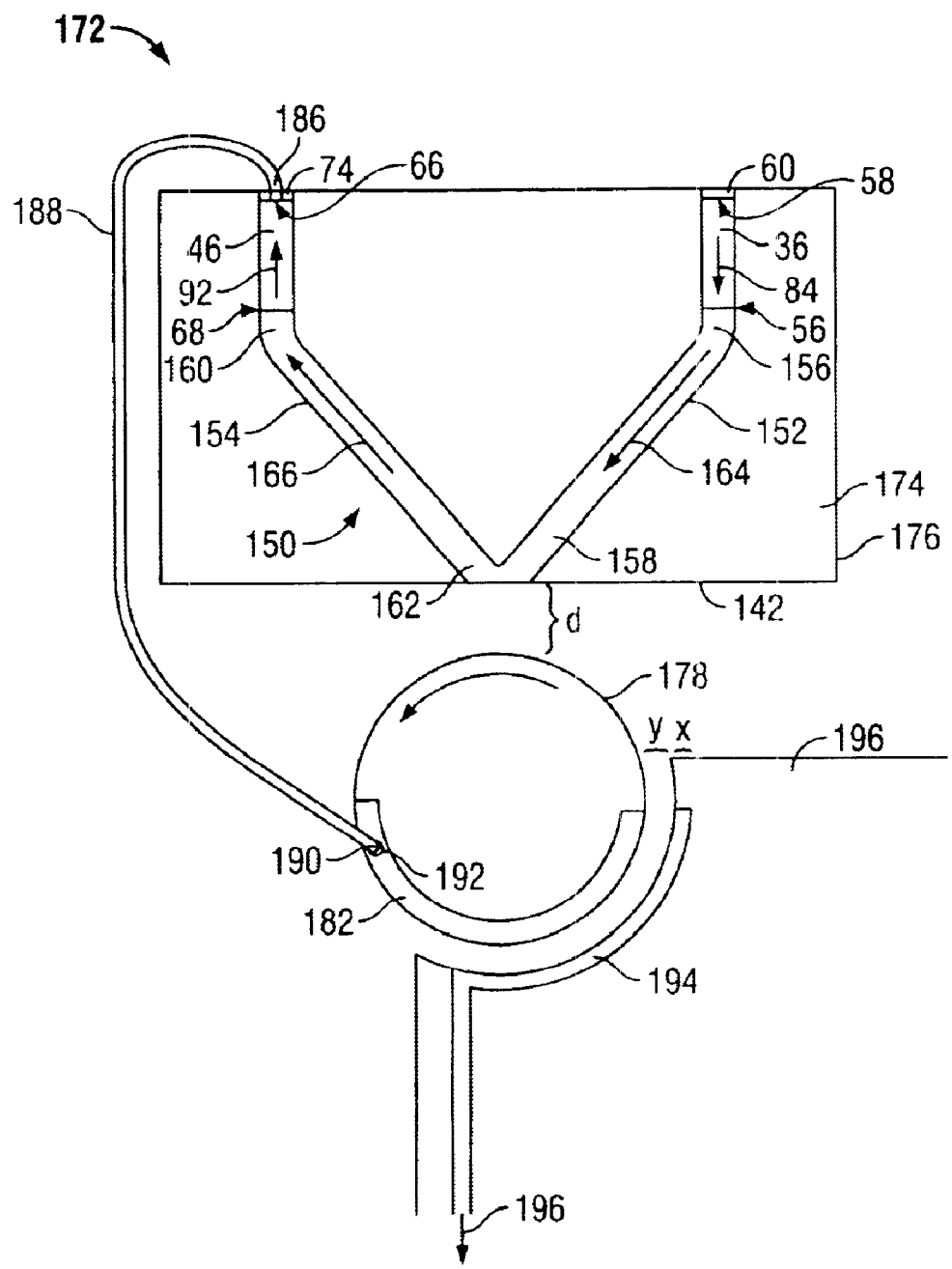
FIG. 8 is a diagram of an electro-optical system that includes a single chip and an optical resonator that are coupled together with a waveguide in combination with a photodiode.

FIG. 8 is a diagram, not to scale, of another embodiment of the present invention that, similar to the embodiment depicted in FIG. 6, includes an electro-optical system 172 having a first and second SOA 36 and 46, respectively, a highly reflective mirror 60, a partially-reflective mirror 74, and a V-shaped waveguide 150, having a first and second branch 152 and 154, respectively, configured on a single substrate 174 that can be formed into a single chip 176. The highly-reflective mirror is coupled to one surface 58 of the first SOA while an opposing surface 56 of the first SOA is coupled to one end 156 of the V-shaped waveguide's first branch. Another end 158 of the first branch is coupled to one end 162 of the V-shaped waveguide's second branch forming an angle. Another end 160 of the V-shaped waveguide's second branch is coupled to one surface 68 of the second SOA. An opposing surface 66 of the second SOA is coupled to the partially-reflective mirror. The resulting structure provides an electro-optical system having a Q of approximately $1 \times 10^3$.

The embodiment depicted in FIG. 8 also includes an optical resonator 178 that is located adjacent to the point at the light interface edge 142 of the single chip 176 where the V-shaped waveguide's first and second branches 152 and 154, respectively, coupled together. In this embodiment, the optical resonator is made of lithium niobate which is a material that allows for the propagation of light however the refractive index is dependent upon electric fields established in the lithium niobate. The optical resonator is typically 3 to 6 millimeters in diameter, which corresponds from 16 to 8 GHz in frequency. The Q for the LiNBO3 optical resonator is approximately $1 \times 10^7$.

Figure 9:
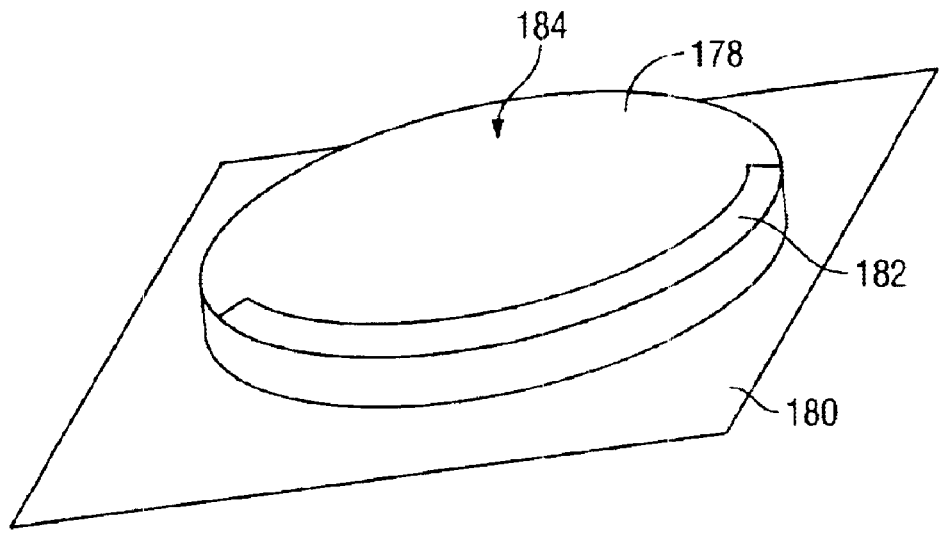
FIG. 9 is a perspective diagram of an optical resonator configured with a half-wavelength electrode.

As shown in FIG. 9, the optical resonator 178 may be cylindrical in shape and formed on top of a substrate 180 that functions as a ground electrode. A top electrode 182 is formed on a top surface 184 of the optical resonator along a portion of the perimeter of the optical resonator. The length of the top electrode is approximately one-half resonant wavelength in length of a microwave frequency. The structure and operation of a half-wave electrode in combination with a lithium niobate optical resonator is discussed in U.S. patent application Ser. No. 09/591,866 entitled "Light Modulation In Whispering-Gallery-Mode Resonators to Maleki, Levi, Iltchenko, and Yao which is incorporated by reference in its entirety as though fully set forth herein.

Referring to FIG. 8, one end 186 of a waveguide 188, which may be an optical fiber, is coupled to the second SOA 46 through the partially-reflective mirror 74. The other end 190 of the waveguide is coupled to a photodiode 192 which in turn is coupled to the top electrode 182 of the optical resonator 178. The waveguide 188 is short in length, typically ranging from 5 to 50 millimeters in length. The localized impedance along the top electrode varies as a function of location due to the standing half-wave created along the length of the top electrode. The photodiode is positioned at a point along the top electrode such that the impedance of the photodiode matches the impedance of the top electrode.

A microstrip transmission line waveguide 194 is formed on a separate substrate 196 and positioned adjacent to the top electrode 182. The width "x" of the microstrip transmission line waveguide is dependent upon the thickness of the separate substrate so as to result in a microstrip transmission line waveguide having a standard 50 Ω impedance. For example, if the separate substrate is formed of alumina to a thickness of approximately 250 micrometers, the width of the microstrip transmission line waveguide is approximately 225 micrometers. The microstrip transmission line waveguide is separated from the top electrode by a distance "y" that is typically between 0.1 and 1.0 times the width "x" of the microstrip transmission line waveguide.

In operation, the first SOA 36 is stimulated by an external potential applied to its electrode 44 and produces light that propagates along the optical axis of the first SOA, indicated by the straight arrow 84, away from the highly-reflective mirror 60 and into the V-shaped waveguide's first branch 152. The light propagates along the first branch in the direction of its curved optical axis, indicated by the curved arrow 164, to the light interface edge 142 of the single chip 176 where the light is internally reflected, at which point an evanescent component of the light is coupled into the optical resonator 178. The internally reflected component of the light and the light evanescently coupled from the optical resonator propagate together along the curved optical axis of the second branch, indicated by the curved arrow 166, and into the second SOA 46. The light then propagates along the second SOA's optical axis, indicated by the straight arrow 92, where it is amplified by light produced by the second SOA. Next, the light exits the second SOA and encounters the partially-reflective mirror 74 resulting in a partial reflectance of the light back toward the second SOA. The portion of the light not reflected by the partially-reflective mirror is optically coupled through the waveguide 188 to the photodiode 192. The reflected light propagates back through the second SOA, V-shaped waveguide's second and first branches, and first SOA until it encounters the highly-reflective mirror which causes the reflected light to again propagate through the first SOA toward the V-shaped waveguide's first branch.

Figure 10:
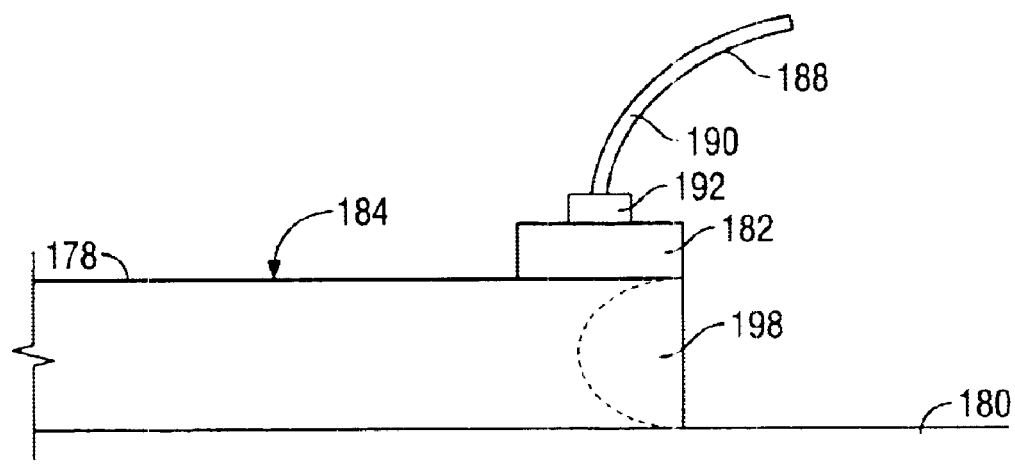
FIG. 10 is a cross-sectional view of an optical resonator configured with a half-wavelength electrode.

The photodiode 192 produces an electrical output signal that depends upon the light coupled into the photodiode via the waveguide 188. The electrical signal output from the photodiode is applied to the top electrode 182 and produces an electrical field between the top electrode and substrate 180 which passes through the region 198 where light propagates in the optical resonator 178 near the outer edge as shown in FIG. 10.

In the embodiment of FIG. 8, the phase delay of the light propagating through the optical resonator 178 is changed by varying the refractive index of the optical resonator by electro-optic modulation. Here, an electrical signal generated by the photodiode 192 is used to modulate the refractive index of the lithium niobate optical resonator, and thus shift the frequency of the light evanescently coupled from the optical resonator into the V-shaped waveguide 150. Also, an output microwave signal 196, the resonant output signal, is capactively coupled from the top electrode into the microstrip transmission line waveguide 194.

In this manner, the light coupled from the single chip 176 into the photodiode 192 is used to modulate the light propagating through the optical resonator 178 which in turn is evanescently coupled into the single chip. Thus, the embodiment depicted in FIG. 8 forms an electro-optic system 172 having an electro-optic feedback loop. The optical resonator has a high Q, and thus, provides for narrow frequency distributions of the output resonant frequencies. The electro-optic feedback loop enforces the modulation and results in the selection of only certain components of the light at only several wavelengths.

Although exemplary embodiments of the present invention have been described, they should not be construed to limit the scope of the appended claims. Those skilled in the art will understand that various modifications may be made to the described embodiments. For example, the optical resonators 30 and 178 may be spherical-shaped, cylindrical-shaped, torodial-shaped, or may have other physical configurations.

In addition, even though the Figures only depict embodiments of the present invention where the optical resonator 30 and 178 is physically separated from a chip 18, 20, 140, 148, and 176 by free space, the distance between the optical resonator and the chip may be maintained by a spacer (not shown) comprised of a thin film of material, for example, FIBERCOAT QLI manufactured by Navitar Coating Labs located in Newport Beach, Calif. One side of the spacer would contact the optical resonator while the opposing side of the spacer would contact the chip.

Moreover, all of the components of each of the electro-optical systems, including the optical resonator and microwave link could be configured in a single chip.

Overall, the various embodiments of the present invention represent a general scheme coupling light between an optical resonator 30 and 178 and at least one semiconductor chip 18, 20, 140, 148, and 176 while keeping the number of components to be aligned to a minimum. Therefore, embodiments of the present invention advantageously minimize the number of alignment steps necessary for mass manufacturing of these electro-optical systems. In some embodiments, only the relative positions of the optical resonator and a single chip must be aligned and adjusted during assembly.

Moreover, to those skilled in the various arts, the invention itself herein will suggest solutions to other tasks and adaptations for other applications. The present embodiments must therefore be considered in all respects as illustrative and not restrictive. The scope of the invention is not limited to those embodiments, but must be determined instead by the appended claims, along with the full scope of equivalents to which those claims are legally entitled.

What is claimed is:

1. A system comprising:
   an electro-absorptive modulator having opposing surfaces;
   a first semiconductor optical amplifier having opposing surfaces, wherein one of the opposing surfaces of the first semiconductor optical amplifier is coupled to one of the opposing surfaces of the electro-absorptive modulator;
   a photodetector having opposing surfaces;
   a second semiconductor optical amplifier having opposing surfaces wherein one of the opposing surfaces of the second semiconductor optical amplifier is coupled to one of the opposing surfaces of the photodetector;
   a microwave link coupled between the photodetector and the electro-absorptive modulator; and
   an optical resonator for coupling evanescent components of light propagated between the first semiconductor optical amplifier and the second semiconductor optical amplifier.

2. The system according to claim 1, further comprising a highly-reflective mirror coupled to another of the opposing surfaces of the electro-absorptive modulator.

3. The system according to claim 2, wherein the first semiconductor optical amplifier, electro-absorptive modulator, and highly-reflective mirror are configured in a first chip.

4. The system according to claim 1, further comprising a partially-reflective mirror coupled to another of the opposing surfaces of the photodetector.

5. The system according to claim 4, wherein the second semiconductor optical amplifier, photodetector, and partially-reflective mirror are configured in a second chip.

6. The system according to claim 1, further comprising a prism coupler, a first lens, and a second lens, wherein the first lens is between the first semiconductor optical amplifier and the prism coupler and the second lens is between the second semiconductor optical amplifier and the prism coupler.

7. The system according to claim 6, wherein the first lens and second lens are gradient index lenses.

8. The system according to claim 6, wherein the prism coupler is selected from the group consisting of a single-reflection prism and a double-reflection prism.

9. The system according to claim 6, wherein the optical resonator is adjacent the prism coupler for coupling light between the prism coupler and the optical resonator.

10. The system according to claim 1, further comprising:
    a highly-reflective mirror coupled to another of the opposing surfaces of the electro-absorptive modulator; and
    a partially-reflective mirror coupled to another of the opposing surfaces of the photodetector,
    wherein the first semiconductor optical amplifier, electro-absorptive modulator, highly-reflective mirror, second semiconductor amplifier, photodetector, and partially-reflective mirror are configured in a single chip.

11. The system according to claim 10, further comprising a prism coupler, a first lens, and a second lens, wherein the first lens is between the first semiconductor optical amplifier and the prism and the second lens is between the second semiconductor optical amplifier and the prism.

12. The system according to claim 11, wherein the first lens and second lens are gradient index lenses.

13. The system according to claim 11, wherein the prism coupler is selected from a group consisting of a single-reflection prism and a double-reflection prism.

14. The system according to claim 11, wherein the optical resonator is adjacent the prism coupler for coupling light between the prism coupler and the optical resonator.

15. The system according to claim 1, wherein the optical resonator is made of fused silica.

16. The system according to claim 1, wherein a shape of the optical resonator is selected from the group consisting of spherical, cylindrical, and toroidal.

17. The system according to claim 1, further comprising a waveguide coupled between another of the opposing surfaces of the first semiconductor optical amplifier and another of the opposing surfaces of the second semiconductor amplifier.

18. The system according to claim 17, wherein the waveguide is V-shaped.

19. The system according to claim 17, further comprising:
    a highly-reflective mirror coupled to another of the opposing surfaces of the electro-absorptive modulator; and
    a partially-reflective mirror coupled to another of the opposing surfaces of the photodetector,
    wherein the first semiconductor optical amplifier, second semiconductor optical amplifier, electro-absorptive modulator, photodetector, highly-reflective mirror, partially-reflective mirror, and waveguide are configured in a single chip.

20. The system according to claim 19, wherein the optical resonator is adjacent the single chip for coupling light between the waveguide and the optical resonator.

21. The system according to claim 1, further comprising:
    a waveguide first branch having one end coupled to another of the opposing surfaces of the first semiconductor optical amplifier; and
    a waveguide second branch having an end coupled to another of the opposing surfaces of the second semiconductor optical amplifier,
    wherein the waveguide first branch is not optically coupled to the waveguide second branch in the absence of an external optical element.

22. The system according to claim 21, further comprising:
    a highly-reflective mirror coupled to another of the opposing surfaces of the electro-absorptive modulator; and
    a partially-reflective mirror coupled to another of the opposing surfaces of the photodetector,
    wherein the electro-absorptive modulator, photodetector, first semiconductor optical amplifier, second semiconductor optical amplifier, highly-reflective mirror, partially-reflective mirror, waveguide first branch, and waveguide second branch are configured on a single chip.

23. The system according to claim 22, wherein another end of the waveguide first branch and another end of the waveguide second branch are located at an edge of the single chip and separated by a distance from 2 to 15 micrometers.

24. The system according to claim 21, wherein the optical resonator is adjacent to both another end of the waveguide first branch and another end of the waveguide second branch allowing for the coupling of light from the waveguide first branch into the optical resonator and the coupling of light from the optical resonator into the waveguide second branch.

25. A system comprising:
   a first semiconductor optical amplifier having opposing surfaces;
   a second semiconductor optical amplifier having opposing surfaces;
   an optical resonator for coupling evanescent components of light propagated between the first semiconductor optical amplifier and the second semiconductor optical amplifier; and
   a first waveguide coupled between one surface of the second semiconductor optical amplifier and the optical resonator.

26. The system according to claim 25, further comprising a second waveguide coupled between one surface of the first semiconductor optical amplifier and another surface of the second semiconductor optical amplifier.

27. The system according to claim 25, further comprising a highly-reflective mirror coupled to another of the opposing surfaces of the first semiconductor optical amplifier.

28. The system according to claim 25, further comprising a partially-reflective mirror coupled to another of the opposing surfaces of the second semiconductor optical amplifier.

29. The system according to claim 25, further comprising:
   a highly-reflective mirror coupled to another of the opposing surfaces of the first semiconductor optical amplifier; and
   a partially-reflective mirror coupled to another of the opposing surfaces of the second semiconductor optical amplifier,
   wherein the first semiconductor optical amplifier, second semiconductor optical amplifier, highly-reflective mirror, partially-reflective mirror, and first waveguide are configured in a single chip.

30. The system according to claim 29, wherein the optical resonator is adjacent the single chip for coupling light between the single chip and the optical resonator.

31. The system according to claim 25, wherein the first waveguide is an optical fiber.

32. The system according to claim 25, wherein the optical resonator is made of lithium niobate.

33. The system according to claim 25, wherein the optical resonator is configured between two electrodes.

34. The system according to claim 33, wherein a photodiode is coupled between the first waveguide and one of the electrodes coupled to the optical resonator.

35. The system according to claim 33, wherein the one of the electrodes is approximately a half wavelength in length for a microwave frequency.

36. The system according to claim 33, further comprising a microstrip transmission line waveguide for capacitively coupling to the one of the electrodes.

37. A method for generating a resonant output signal using an electro-optical system, the method comprising:
   propagating light from a first semiconductor optical amplifier to a second semiconductor optical amplifier;
   coupling an evanescent component of the light propagating from the first semiconductor optical into an optical resonator;
   coupling an evanescent component of light propagating in the optical resonator into the light propagating to the semiconductor optical amplifier;
   generating an electrical signal based on light propagating through the second semiconductor optical amplifier using a photodetector;
   coupling the electrical signal from the photodetector through a microwave link to an electro-absorptive modulator; and
   modulating the light propagating from the first semiconductor optical amplifier using the electro-absorptive modulator based on the electrical signal.

38. The method according to claim 37, wherein the light propagating from the first semiconductor optical amplifier to the second semiconductor optical amplifier propagates through a first lens, a prism coupler, and a second lens.

39. The method according to claim 37, wherein the light propagating from the first semiconductor optical amplifier to the second semiconductor optical amplifier propagates through a waveguide.

40. A method for generating a resonant output signal using an electro-optical system, the method comprising:
   coupling light from a first semiconductor optical amplifier into an optical resonator;
   coupling light from the optical resonator to a second semiconductor optical amplifier;
   generating an electrical signal based on light propagating through the second semiconductor optical amplifier using a photodetector;
   coupling the electrical signal from the photodetector through a microwave link to an electro-absorptive modulator; and
   modulating the light propagating from the first semiconductor optical amplifier using the electro-absorptive modulator based on the electrical signal.

41. The method according to claim 40, wherein the light coupled from the first semiconductor optical amplifier into the optical resonator propagates through a waveguide.

42. The method according to claim 40, wherein the light coupled from the optical resonator to the second semiconductor optical amplifier propagates through a waveguide.

43. A method for generating a resonant output signal using an electro-optical system, the method comprising:
   propagating light from a first semiconductor optical amplifier to a second semiconductor optical amplifier;
   coupling an evanescent component of the light propagating from the first semiconductor optical amplifier into an optical resonator;
   coupling an evanescent component of light propagating in the optical resonant into the light propagating to the semiconductor optical amplifier;
   coupling light propagating through the second semiconductor optical amplifier to the optical resonator;
   modulating light propagating in the optical resonator based on the light coupled from the second semiconductor optical amplifier to the optical resonator.

44. The method according to claim 43, wherein the light is coupled from the second semiconductor optical amplifier to the photodiode through a first waveguide.

45. The method according to claim 43, wherein the light propagating from the first semiconductor optical amplifier to the second semiconductor optical amplifier propagates through a second waveguide.

46. The method according to claim 43, wherein the light propagating through the second semiconductor optical amplifier is coupled to a photodiode that generates an electrical signal used to modulate the light propagating in the optical resonator.

* * * * *